Dec. 2, 1941.     W. E. HUBBARD     2,264,379
PISTON UNIT
Filed Jan. 24, 1939     2 Sheets-Sheet 1

INVENTOR.
William E. Hubbard
BY
Barry & Cyr
ATTORNEYS.

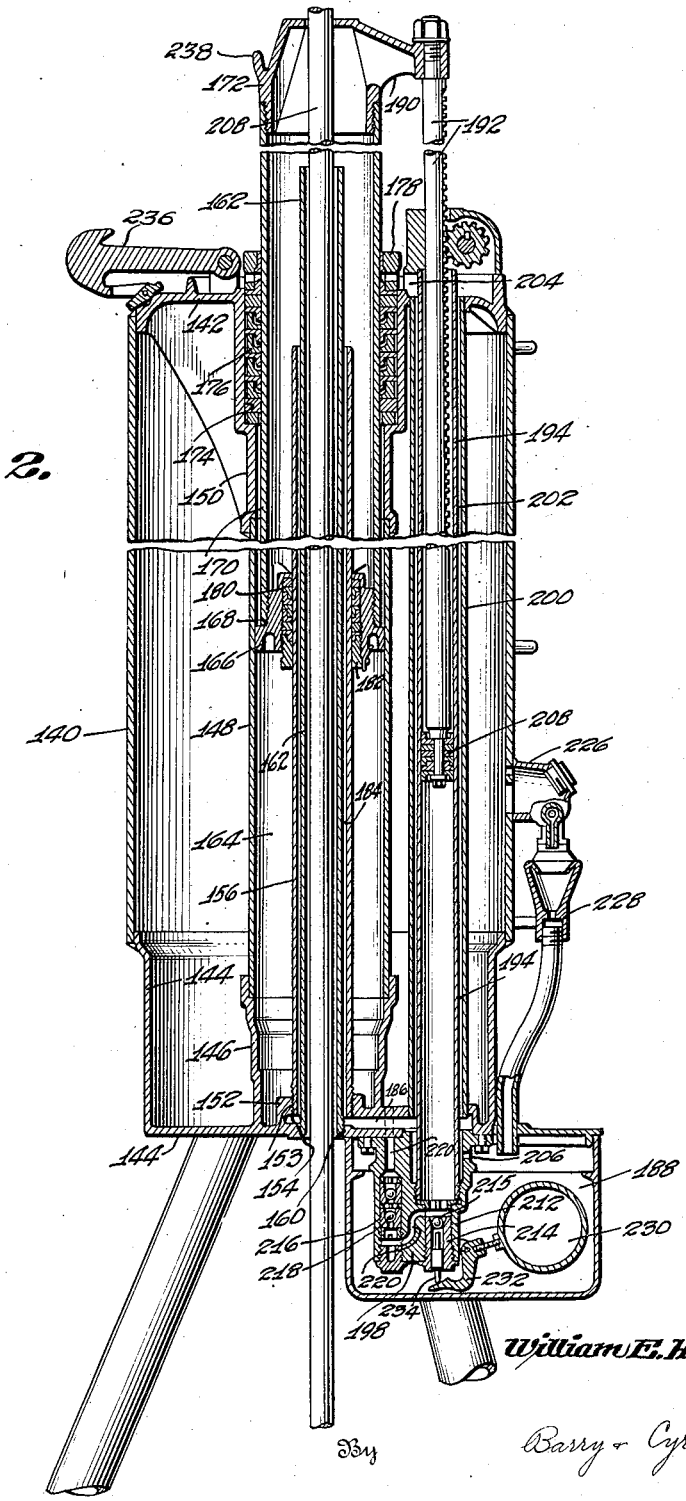

Patented Dec. 2, 1941

2,264,379

UNITED STATES PATENT OFFICE 2,264,379

PISTON UNIT

William E. Hubbard, Tulsa, Okla., assignor to Hydraulic Pumper Incorporated, Tulsa, Okla., a corporation of Oklahoma Application January 24, 1939, Serial No. 252,684

2 Claims. (Cl. 121—46)

This invention relates to a reciprocating piston unit used in conjunction with force pumps, and more particularly but not by way of limitation to a piston unit for use with a long stroke hydraulic pump of the type shown in my co-pending application Serial No. 252,032, filed Jan. 20, 1939.

In conventional piston units for hydraulic pumps or the like, the piston is connected to a piston rod moving through an apertured cylinder wall. A stuffing box surrounding the rod is usually provided in order to prevent leakage from the piston unit through the piston cylinder. Furthermore in deep well oil pumps actuating a working barrel through a sucker rod connection, it has been found that a fixed alignment of the polish rod and its cooperating sucker rods has a tendency to cause breaking of the rods, especially if the derrick is moved for any reason to cause a distorted alignment of the rods with respect to the well hole.

It is therefore an important object of this invention to provide a reciprocating piston unit for use with force pump that provides for a rod connection whereby a cooperating stuffing box to prevent leakage of fluid around the rod is eliminated.

And still another important object of this invention is to provide a piston disposed between a pair of cylinders with the connecting piston rod for the piston extending through one of the cylinders to allow for flexibility in the connection of the piston rod relative to the piston unit whereby rod breakage due to distortion in alignment is prevented.

And still another important object of this invention is to provide a piston unit provided with air chambers containing fluid under pressure which serve to dampen any shocks that may occur during the reciprocation of the piston.

And a further important object of the invention is to provide a piston unit disposed between a pair of cylinders wherein the unit is provided with air chambers cooperating with a spring to dampen any shocks during reversal of the stroke of the piston unit.

Other objects and advantages of my invention will be evident from the following detailed description read in conjunction with the accompanying drawings which illustrates one form of my new invention.

In the drawings:

Fig. 2 is a view similar to Fig. 1 showing a modified form of the reciprocating piston unit.

Figure 1:
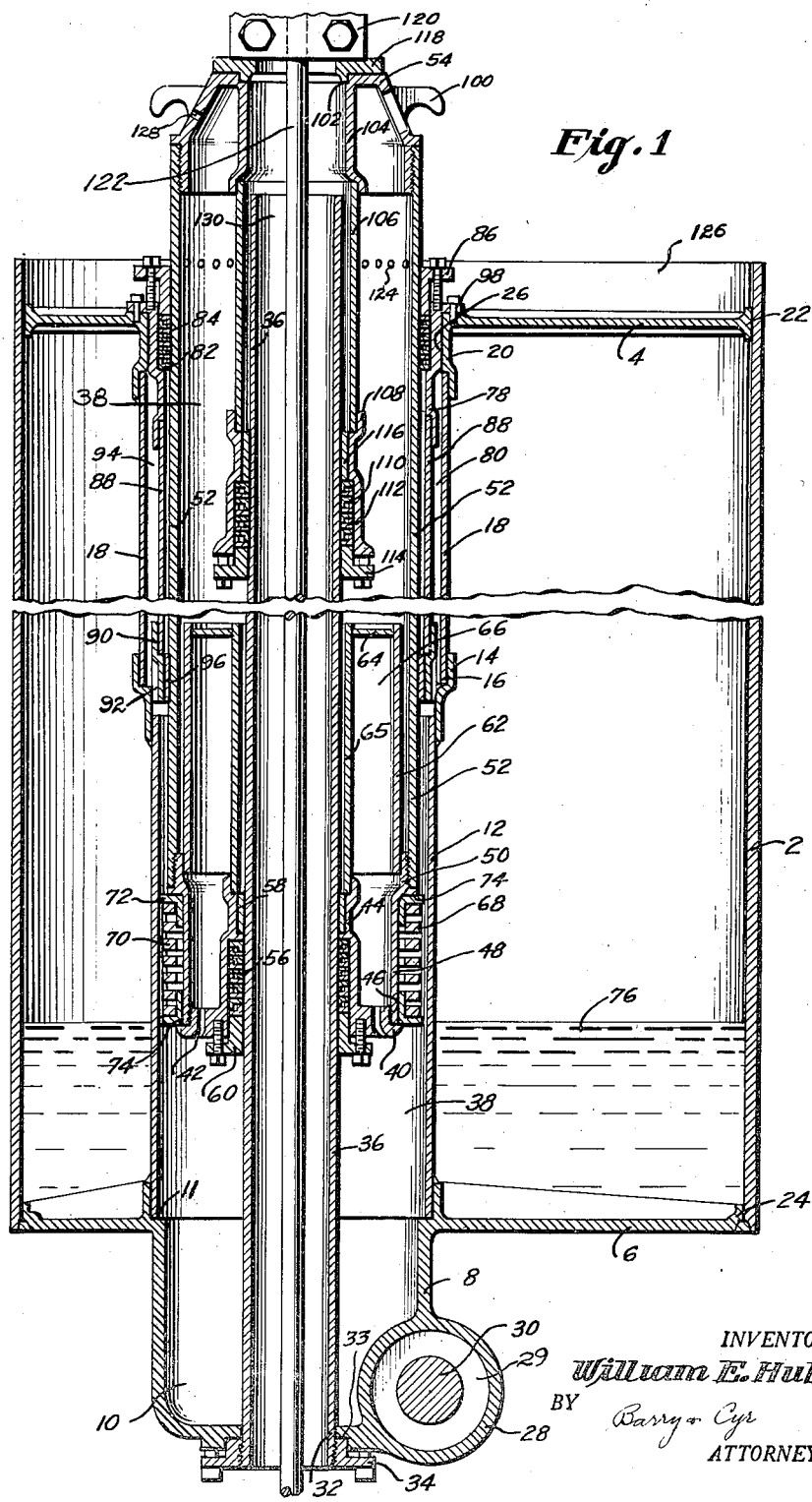
Fig. 1 is a fragmentary sectional elevational view showing in detail the piston unit disposed in a tank containing a fluid under pressure and in communication with the piston unit.

Referring to the drawings in detail and particularly to Fig. 1 the piston unit is shown disposed within cylindrical tank 2 forming part of the hydraulic pump above mentioned, and closed at the top and bottom by cast steel plates or manifolds 4 and 6 respectively. The lower plate 6 has an integral housing 8 forming a lower chamber 10 for the piston unit. At the place where the head or plate 6 is joined with the depending housing 8, shoulders 11 are provided to embrace the lower end of a tubular cylinder 12 for the piston unit. The cylinder 12 extends vertically upward into fixed relation with an annular collar 14. The upper portion of the collar 14 is of greater diameter than its lower portion thereby providing an annular shoulder 16 into which a second cylinder 18 is secured. The cylinder 18 extends vertically upward, and its upper end is secured to a depending flange 20 integral with the upper head 4.

Both the upper head 4 and the lower head 6 are provided with peripheral flanges 22 and 24 respectively that are secured to the annular wall of the tank 2. The flange 20 provides an aperture 26 at the upper end of the tank. The housing 8 has an integral housing 28 formed with a bore 29 in order to allow passage of a crank shaft 30 for motivating a radial pump (not shown) forming part of the hydraulic pumping apparatus. The housing 8 has a bottom aperture 32 surrounded by an annular shoulder 33, and it receives an annular plate 34 bolted to the lower end of housing 8. An outer cylinder cooperates with an inner cylinder 36 which has its lower end in threaded connection with the plate 34.

With the cylinders 12 and 18 properly fixed between the heads 4 and 6, the inner cylinder 36 extends vertically upward through the outer cylinders 12 and 18 to a point above the upper edge of tank 2. As the inner and outer cylinders are spaced from one another, they provide a chamber 38 therebetween. An annular plunger base 40 is apertured at 42 and adapted to surround the cylinder 36, and it is provided with an upwardly extending flange or sleeve 44. The peripheral portion of the base 40 is provided with threads 46 which connect it to an annular sleeve 48 having its upper end provided with a threaded portion 50 for connecting the same to an intermediate cylinder 52. The cylinder 52 extends from the sleeve 48 vertically upward through the head 4 to a position substantially above the tank 2 where the topmost portion threadedly secures a piston head 54. It will be apparent that the cylinder 52 substantially forms the outer periphery of the piston unit.

The plunger base sleeve 44 is constructed with a varying inner diameter in order to provide a space between the sleeve 44 and the inner cylinder 36 for the reception of leather or fabric packing rings 56, and an annular bushing 58. The rings 56 are firmly anchored between the sleeve 44 and the cylinder 36 by an annular gland 60 (of L-shaped cross section) to the plunger base 40. Such packing serves to prevent any fluid from escaping from the chamber 38 upwardly along the inner guide cylinder 36. Of course the packing also serves to guide the piston on such cylinder. A cylinder 62 is fixed to the upper end of sleeve 48, and extends vertically upward to a place where an annular horizontally disposed plate 64 is fixed thereto. A cylinder 65 is secured to the upper end of sleeve 44 and extends upward to a point where it is secured to the horizontal plate 64. In this manner, a fluid chamber 66, closed at its upper end by the plate 64 and at its lower end by the base 40, is formed. Ports 42 in the base 40 allow fluid from chamber 38 to enter chamber 66 so as to compress the air within the latter. The sleeve 48 is reduced in diameter relatively to the outer cylinder 12 so as to form a chamber 68 for receiving a helical shock absorbing spring 70 which is confined between the annular glands 72 which are (L-shaped in cross section) and are slidably arranged on the sleeve 48. Movement of these glands is limited by shoulders 74 formed on parts 40 and 48.

It will be understood that under working conditions a fluid under pressure is to act against the plunger base 40 to cause reciprocation of the piston unit. In the present instance there is shown a fluid 76 in the tank 2 in communication with the chamber 38 by a port (not shown), however it will be obvious that the piston unit can be constructed separate from the tank 2 with fluid supplied by any interconnecting conduit or the like, to the chamber 38 beneath the base 40. The fluid 76 contained in the tank 2 consists of air, light oil or water and since it is under pressure acts as a solid, but it will be apparent that with the fluid 76 being forced to the lower face of the base 40, by a source not shown, the motivation of the fluid will have a tendency to cause a bubbling wherein occasional air bubbles from the air pressure in the tank will intermix with the other fluid. The intermixed air and liquid will pass through the port 42 into the chamber 66, and air being lighter than either oil or water will be compressed in the chamber 66 to such an extent that the fluid pressure is equalized. In this condition, the chamber 66 with its combined compressible and non-compressible fluid pressure acts as a cushioning medium to assist in the absorption of shocks due to the reciprocation of the piston. This shock absorption achieved by the chamber 66 is particularly prevalent during the travel of the piston as well as when the piston is reversed either on the upstroke or the down stroke.

A flanged upper guide sleeve 78 is disposed between the recess 26 and the cylinder 52, and extends downward into a chamber 80 provided by the spaced relation of the cylinders 52 and 18. The guide sleeve 78 is formed with a shoulder 82 to support packing rings 84 interposed between the sleeve 78 and the cylinder 52. The packing rings 84 are held firmly by a packing gland 86 bolted to the head 78. A cylinder 88 is fixed to the lower portion of the piston guide sleeve 78 and extends vertically downward where it is fixed to an annular piston guide 90 provided with a plurality (preferably six) of vertical ports 92 spaced peripherally about said guide. The space between the cylinders 18 and 88 form an air chamber 94, which is complementary to the chamber 66, and functions in a manner similar to that chamber, in that the air under pressure has been intermixed in the tank with the non-compressible fluid, passes by the spring 70, through the space 68 and upward through the ports 92 into the chamber 94. Chamber 94 becomes filled with air and other fluid under pressure similar to the chamber 66 and consequently acts as an additional cushioning medium for the complete piston unit to absorb shocks upon the vertical travel of the piston unit. A cylindrical bushing 96 is interposed between the guide 90 and the cylinder 52.

It will be apparent that the combined construction of the plunger guide sleeve 78, cylinder 88, packing 82, bushing 96 and lower piston guide 90 form a complete outer guide unit for the piston; it being understood that the cylinder 52 forms substantially the outer periphery of the piston unit. This particular construction of the guide unit has a special purpose in that the upper guide sleeve 78 can be unbolted at 98 from the head 4, so that any conventional hoisting means when attached to the hooks 100 on the piston head 54 may be employed to hoist the complete piston out of the chamber 38. It is to be noted that as the piston unit, comprising mainly cylinder 52 and base 40 are being removed from the tank, the spring 70 and glands 72 contact the lower guide 90 to force said guide 90 and its cooperating guiding structure above mentioned upward and out of the cylinder. The complete removal of the piston as a unit has a particular advantage in that it facilitates repairs, replacing of packing, bushings, or any worn parts with a minimum of time.

The plunger head 54 has a top aperture 102 and adjacent thereto, the head 54 is provided with a depending extension forming an inner sleeve 104, having fixed thereto a downwardly extending cylinder 106. The cylinder 106 is disposed between the cylinders 36 and 52, and has its lower end fixed to an inner guide sleeve 108. The inner guide sleeve 108 is of a varying inner diameter in order to provide a space 110 for receiving packing rings 112 held therein by the glands 114 secured to the inner guide sleeve 108. An annular bushing 116 is interposed between the cylinder 106 and the sleeve 108. The top of the plunger head 54 is closed by a cover plate 118 upon which rests a polish rod clamp 120 secured to the polish rod 122 that extends through the cylinder 36 into the well hole for connection with the sucker rods (not shown).

Essentially the packing rings 112 and the bushing 116 prevent leakage of fluid which might occur through the packing 56. If it were not for the packing 112, the fluid might leak past the guide sleeve 108, over the top of cylinder 36, and pass therethrough to the derrick floor. The cylinder 52 has a plurality of spaced apertures or ports 124 through which any liquid leaking past packing 56 may pass through chamber 38, ports 124 and into a reservoir 126 formed in the top of the tank 2. An excess of leaking liquid which does not pass through the ports 124 will pass through the ports 128 provided in the plunger head 54 and thence into the reservoir 126.

It is to be noted that the diameter of the cylinder 36 is slightly less than the diameter of the aperture 102. The use of a piston unit of this construction with a hydraulic pump connected to a sucker rod and cooperating working barrel, is shown in my co-pending application. The interior of the cylinder 36 forms a space permitting the sucker rod, and working barrel to be pulled out of a well hole through passageway 130, without necessarily removing the complete piston unit. In the present instance the polish rod 122 is utilized for connecting the piston in any adaption as a pump. The space 130 provided by the cylinder 36 causes a flexible alignment of the rod 122 which allows for the efficient operation of the piston if for any reason the rod 122 becomes distorted in alignment. It will be apparent that the piston unit reciprocates between a small inner cylinder 36 and outer cylinders 12 and 18, all combined within a pressure tank 2, however it will be obvious that the cylinders can be constructed apart from the tank 2 to form a separate unit. Alluding further to the flexibiliy of the polish rod 122 it will be seen that this construction allows for several feet between the point of attachment of the rod 122 and the bottom of the piston unit, to allow for great variation in alignment.

This feature of the invention has another purpose distinguishing it from standard structure, in that it eliminates a stuffing box through which the connecting rod 122 would ordinarily be reciprocated. In balanced hydraulic pumps utilizing a piston of the type disclosed for pumping of oil wells it is well known that all oil wells contain more or less water highly corrosive in action, and the actuation of a polish rod through a stuffing box would cause the water to corrode the outer surface of the polish rod whereby it would be practically impossible to keep packing intact in the stuffing box. Under such conditions the packing would allow fluid leakage from the hydraulic pump, which would necessarily distort the pressure balance in a balanced hydraulic pumping system. In the present invention, all leakage through the packing of the piston unit is deposited in the reservoir 126, so that it can be returned to the tank 2, however it will be apparent that any fluid leakage deposited in the reservoir can be allowed to flow to any separate tank containing a fluid under pressure. The stuffing box or packing 112 surrounding the inner cylinder 36 has an additional purpose in that a small quantity of the fluid leakage that may leak there-through provides lubrication for the piston unit moving in a rectilinear path along the cylinder 36.

In Fig. 2 is shown a modified form of the piston adapted for use with a long stroke hydraulic pump of the type disclosed in my co-pending application above mentioned. The piston unit is disposed in a tank 140 having an upper head 142 and a lower head 144. The lower head 144 has a sleeve portion 146 into which is secured a cylinder 148 extending vertically upward into fixed relation with a depending flange or sleeve 150 of the upper head 142. The lower head 144 has a second flange 152 disposed within the sleeve 146 and provided with an aperture 154 forming a major bore provided with interior threads 153 for receiving a cylinder 156 extending vertically upward through the cylinder 148 to a point in proximity of the upper head 142. The aperture 154 is provided with a minor bore having threads 160 for receiving a cylinder 162 disposed within the cylinder 156 and extending vertically upward through the tank to a position above the upper head 142. The spaced relation of the cylinders 148 and 156 forms a chamber 164 in which the piston unit is adapted to reciprocate.

The piston comprises an annular piston base 166 having a reduced portion forming shoulders 168 into which is secured a cylinder 170 extending vertically upward through the cylinder head 142 to receive a piston head 172. The flange 150 is of an increased diameter forming a space 174 for receiving a plurality of leather or fiber packing rings 176 interposed between the flange 150 and the cylinder 170. The packing rings act as a stuffing box and are rigidly anchored in the space 174 by packing glands 178 and effectively prevent any leakage around the outer walls of the piston. It will be understood that the cylinder 170 substantially forms the outer periphery of the piston. A plurality of packing rings 180 are interposed between the piston base 166 and the cylinder 156 and are held in position by a packing nut 182 threaded to the piston base 166. The spaced relation of the cylinders 156 and 162 form a chamber 184 and any fluid leakage through the packing 180 flows into the chamber 184 to a communicating chamber 186 communicating with a sump or reservoir 188 forming part of the lower head 144.

The head 172 has an integral arm 190 to which is attached a rack 192 extending into a cylinder 194, secured to a valve housing 198 disposed in the sump 188. The cylinder 194 extends vertically upward through the tank to a position slightly above the upper head 142. A cylinder 200 is secured between the upper head 142 and the lower head 144 and surrounds the cylinder 194 in spaced relation thereto to form a chamber 202 in communication with a port 204 providing communication with the packing 176, wherein any leakage through the packing 176 flows through the port 204 and chamber 202 into the chamber 186 and through a port 206 into the sump or reservoir 188.

It will be understood that the tank 140 contains a fluid under pressure in communication with the chamber 164 and is motivated by a radial pump (not shown) to cause reciprocation of the piston. With the reciprocation of the piston unit, the attachment of the rack 192 to the piston head 172 causes simultaneous reciprocation of the rack 192 and an auxiliary plunger 208. The valve housing 198 is provided with a bore 212 for receiving an apertured valve seat 214 and valve 215. The valve housing 198 has a second bore 216 adjacent to bore 212 for receiving a plurality of ball valves 218 in communication with the cylinder 194 by a port 220. A port 222 provides communication for the valves 218 with the interior of the tank 140.

With the reciprocation of the piston in an upward stroke the rack 192 and plunger 208 likewise move upward to pull any leakage fluid in the reservoir 188 through the valve 215 into the cylinder 194. On the down or pumping stroke of the piston, the rack 192 and its cooperating plunger 208, any fluid in cylinder 194 below plunger 208 is displaced through the port 220, the discharge valves 218, port 222 into the tank 140.

The tank has a pipe 226 to allow filling of the tank with fluid. The pipe 226 has an overflow structure 228 in communication with the sump 188 where any over flow fluid will flow into the sump 188. It will be noted that the sump 188 has a float 230 pivotally connected to the housing 198 by an angled bracket arm 232 having one leg bearing against a stud 234 adapted to contact the ball valve 215. This float has a particular purpose in that the capacity of the plunger 208 provided with the rack unit is greater than ordinary fluid leakage, consequently when oil is pulled into the cylinder 194 on the intake stroke, the fluid in the sump is decreased to allow the float to descend. In that motion the arm 232 raises the intake valve 215 off its seat. This has a particular purpose in that, if there is no fluid in the sump 188, the float 230 remains in the bottom of the sump, and with valve 215 open the auxiliary piston 208 on its downward stroke will force displaced fluid back into the sump through open valve 215, rather than through the ports 220 and 222 and into the tank 140.

A hook 236 is attached to the upper head 142 and cooperates with a hook 238 provided on the piston head 172, so that in a hoisting operation of the piston out of the chamber 164 for repairs and the like, the hook provides an attachment for a hoisting means as well as assisting in holding the piston unit in proper alignment during the hoisting operation.

Changes may be made in the combination and arrangement of parts as heretofore set forth in the specification and shown in the drawings, it being understood that any modification in the precise embodiment of the invention may be made within the scope of the following claims without departing from the spirit of the invention.

What I claim is:

1. In a hydraulic lifting apparatus comprising a plurality of concentric cylinders, a piston adapted to reciprocate between the cylinders, said piston comprising a base having a cylinder secured thereto, a piston head secured to the last mentioned cylinder, said base provided with means forming a fluid chamber within said piston, inner and outer guiding means for the piston, said outer guiding means cooperating with one of the concentric cylinders to form a second fluid chamber cooperating with the first mentioned fluid chamber to dampen any shocks during the reciprocation of the piston, a piston rod supported by the piston head and extending through the inner one of said concentric cylinders to provide a flexible alignment of the rod with respect to the piston.

2. In a hydraulic lifting apparatus comprising a plurality of concentric cylinders, a piston adapted to reciprocate between the cylinders, said piston comprising a base having a reduced portion, a sleeve secured to the reduced portion, a cylinder secured to the outer periphery of the sleeve and extending vertically upward, a piston head secured to the last mentioned cylinder, means cooperating with the base for forming a fluid chamber within said piston, inner and outer guiding means for the piston, said outer guiding means cooperating with one of the concentric cylinders to form a second fluid chamber cooperating with the first mentioned fluid chamber in order to dampen any shocks during reciprocation of the piston, and a piston rod supported by the piston head and extending through the inner one of said concentric cylinders to provide a flexible alignment of the rod with respect to the piston.

WILLIAM E. HUBBARD.